US006416857B1

(12) United States Patent
Wright et al.

(10) Patent No.: US 6,416,857 B1
(45) Date of Patent: Jul. 9, 2002

(54) TAMPER INDICATING DEVICE

(75) Inventors: Mark A. Wright, Hudson, WI (US); Raymond R. Rivera, Cottage Grove, MN (US); Thomas P. Hanschen, St. Paul, MN (US); Julian B. Cooley, Becida, MN (US); Raymond R. Gosselin, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/696,453

(22) Filed: Oct. 25, 2000

(51) Int. Cl.[7] .......... B32B 7/10; B32B 7/12; G09F 3/03

(52) U.S. Cl. .......... 428/343; 428/354; 428/341; 428/213; 428/214; 428/215; 428/219; 428/500; 428/515; 428/915; 428/916

(58) Field of Search .......... 428/42.1, 36.7, 428/343, 354, 213, 214, 216, 217, 515, 500

(56) References Cited

U.S. PATENT DOCUMENTS

| | | | | | |
|---|---|---|---|---|---|
| 3,993,826 | A | | 11/1976 | Butler et al. | 428/220 |
| 4,125,662 | A | | 11/1978 | Weiner et al. | 428/213 |
| 4,147,827 | A | | 4/1979 | Breidt, Jr. et al. | 428/218 |
| 4,239,428 | A | | 12/1980 | Knott, II et al. | 428/36.7 |
| 4,252,851 | A | | 2/1981 | Lansbury et al. | 428/336 |
| 4,254,169 | A | | 3/1981 | Schroeder | 428/35 |
| 4,356,221 | A | | 10/1982 | Anthony et al. | 428/35 |
| 4,362,844 | A | | 12/1982 | Lemstra et al. | 525/57 |
| 4,364,981 | A | | 12/1982 | Horner et al. | 428/35 |
| 4,419,408 | A | | 12/1983 | Schmukler et al. | 428/424.4 |
| 4,419,411 | A | | 12/1983 | Park | 428/516 |
| 4,630,891 | A | | 12/1986 | Li | 350/105 |
| 4,652,473 | A | | 3/1987 | Han | 428/35 |
| 4,713,273 | A | | 12/1987 | Freedman | 428/40 |
| 4,721,638 | A | * | 1/1988 | Matsuguchi et al. | 428/40 |
| 4,726,984 | A | | 2/1988 | Shah | 428/216 |
| 4,784,885 | A | * | 11/1988 | Carespodi | 428/36.8 |
| 4,828,915 | A | | 5/1989 | Schroeder et al. | 428/332 |
| 4,876,123 | A | * | 10/1989 | Rivera et al. | 428/34.2 |

(List continued on next page.)

FOREIGN PATENT DOCUMENTS

| | | |
|---|---|---|
| DE | 196 53 891 | 6/1998 |
| EP | 0 349 160 | 1/1990 |
| EP | 0 404 402 | 12/1990 |
| EP | 0 210 261 B1 | 6/1991 |
| EP | 0 408 971 | 3/1995 |
| EP | 0 681 913 | 11/1995 |
| EP | 0 335 425 | 1/1997 |
| EP | 0 845 767 | 6/1998 |
| FR | 2 664 609 | 1/1992 |
| GB | 2 211 760 | 7/1989 |
| WO | WO 86/04547 | 8/1986 |
| WO | WO 93/06183 | 4/1993 |
| WO | WO 98/56581 | 12/1998 |
| WO | WO 00/43977 | 7/2000 |

OTHER PUBLICATIONS

Tamper evident delaminating film, as described in PCT Publication EO 00/43997, published Jul. 27, 2000, was offered for sale in the United States by applicant prior to Oct. 25, 1999.

*Primary Examiner*—Fred J. Parker
*Assistant Examiner*—Elena Tsoy
(74) *Attorney, Agent, or Firm*—Melissa E. Buss

(57) ABSTRACT

The invention is a tamper indicating device including a backing. The backing includes a first phase and a second phase. The backing is normally light transmissive, but a peeling force causes the backing to internally delaminate and become opaque. A first skin layer is fixed to the backing wherein the skin layer minimizes pre-destruction of the backing. A layer of adhesive is applied to the first skin layer, which can be affixed to a substrate.

23 Claims, 3 Drawing Sheets

U.S. PATENT DOCUMENTS

| | | | | | |
|---|---|---|---|---|---|
| 4,888,075 | A | | 12/1989 | Freedman | 156/243 |
| 4,946,532 | A | | 8/1990 | Freeman | 156/243 |
| 4,980,222 | A | | 12/1990 | Rivera et al. | 428/195 |
| 5,061,262 | A | | 10/1991 | Chen et al. | 604/389 |
| 5,143,570 | A | | 9/1992 | Freedman | 156/230 |
| 5,153,042 | A | | 10/1992 | Indrelie | 428/40 |
| 5,190,812 | A | | 3/1993 | Joseph et al. | 428/237 |
| 5,277,915 | A | | 1/1994 | Provonchee et al. | 424/485 |
| 5,277,971 | A | | 1/1994 | Weng et al. | 428/485 |
| 5,358,281 | A | | 10/1994 | Greig | 283/81 |
| 5,372,669 | A | | 12/1994 | Freedman | 156/243 |
| 5,405,692 | A | | 4/1995 | Weng et al. | 428/343 |
| 5,589,122 | A | | 12/1996 | Leonard et al. | 264/46 |
| 5,599,602 | A | | 2/1997 | Leonard et al. | 428/560 |
| 5,633,058 | A | | 5/1997 | Hoffer et al. | 428/40.1 |
| 5,660,922 | A | | 8/1997 | Herridge et al. | 428/214 |
| 5,700,564 | A | | 12/1997 | Freedman | 428/332 |
| 5,721,086 | A | | 2/1998 | Emslander et al. | 428/126 |
| 5,770,283 | A | * | 6/1998 | Gosselin et al. | 428/35.7 |
| 5,804,610 | A | | 9/1998 | Hamer et al. | 522/182 |
| 5,985,075 | A | | 11/1999 | Freedman | 156/229 |
| 6,004,656 | A | | 12/1999 | Gosselin et al. | 428/198 |
| 6,040,027 | A | | 3/2000 | Freedman | 428/40.1 |
| 6,138,830 | A | * | 10/2000 | Muggli | 206/532 |
| 6,146,744 | A | | 11/2000 | Freedman | 428/213 |
| 6,156,252 | A | | 12/2000 | Freedman | 264/173.15 |
| 6,245,418 | B1 | | 6/2001 | Freedman | 428/220 |
| 2001/0006291 | A1 | | 7/2001 | Wenninger et al. | 283/81 |
| 2001/0006713 | A1 | | 7/2001 | Otten et al. | 428/40.1 |

* cited by examiner

TAMPER INDICATING DEVICE

CROSS-REFERENCE TO RELATED APPLICATION(S)

None.

BACKGROUND OF THE INVENTION

The invention relates generally to tamper indicating adhesive devices, and more particularly to devices such as tapes, labels, and label stock that indicate tampering attempts through internal delamination.

It is known to provide a tamper indicating device which may be adhered to various articles. Devices are known that indicate tampering by changing their appearance upon attempts to remove the device from the article.

These devices may provide some type of information, such as a serial number or other identification, or may provide an indication of the authenticity of the article. In such a case, it is desirable to provide an indication of tampering to prevent the device with the information thereon from being removed and re-adhered to another article.

Additionally, these devices may be placed on an article that is some type of container. In such a case, the tamper indicating device may be placed across two separable portions of the article to indicate if tampering has occurred to the contents of the container. For example, it may be desirable to adhere the tamper indicating device both to the flap and the main body of a card, envelope or carton. In this way, removal of the tamper indicating device to gain access to the contents will cause the device to provide an indication of tampering.

One particular tamper indication device is a film which utilizes a mixture of incompatible polymers such that when an attempt is made to remove the film (e.g., in the form of adhesive tape) from a substrate (such as a sealed package) the film internally "delaminates," causing the two polymers in the film to separate and split apart. This type of film can be known as Tamper Evident Delaminating (TED) film. One such film is described in U.S. Pat. No. 4,876,123 ('123), assigned to the assignee of the present application. In the '123 patent, a light transmissive film is disclosed which is derived from a composition comprising 50 to 85 parts by weight of a first copolymer comprising at least one moiety derived from at least one olefinic monomeric unit and 50 to 15 parts by weight of a second copolymer comprising at least one moiety derived from at least one vinyl alcohol monomeric unit. The second copolymer is sufficiently incompatible to the first copolymers such that two phases are formed within the film, one of the phases being continuous. The film can be made into a tape which can include various colorants and indicia (e.g., printed lettering or flood coating) that provide an indication of tampering, as well as including an adhesive layer for adhering the film to an article. When the film delaminates, such as upon attempts to remove it from a container, it becomes more opaque so that the first indicia are obscured when viewed through the delaminated film, and the second indicia become perceptible over the delaminated opaque film. The '123 patent explains that the film may be produced by any suitable film generating process, but is preferably produced by dry blending the first and second polymers together, air drying the blend at 200° F. (93.3° C.) for 48 hours, then extruding the blend onto a driven chilled roll.

U.S. Pat. No. 4,980,222 ('222) also assigned to the assignee of the present application discloses tamper indicating tape based on the same film as that disclosed in the '123 patent. The devices disclosed in the '222 patent include a variety of arrangements for obscuring and revealing tamper indicating messages and ways for adhering the tape to articles and is incorporated in its entirety herein.

An issue with TED film is that since TED film is designed to be very sensitive (in order to indicate when tampering has occurred) unintended pre-destruction (or pre-destruct) of the TED film may occur. For some constructions of TED film, pre-destruct occurs when forces caused by unwinding the adhesive coated TED film (or TED tape) from a roll or removing a release liner from an adhesive on the TED film cause the TED film to begin to delaminate. Pre-destruct may occur with some constructions of TED films even with premium release systems (i.e., liner release values as low as 10 grams/inch (3.9 grams/cm)) such as is available from DCP-Lojha, Dixon, Ill. If indicia are included on the TED film, the pre-destruct causes the covert message to appear and gives a "false positive" tampering signal (or in other words, a false indication that tampering has occurred). The TED film may completely delaminate due to these pre-destruct forces, or may delaminate at discrete portions of the film, also known as "fracturing."

BRIEF SUMMARY OF THE INVENTION

The invention is a tamper indicating device including a backing. The backing includes a first phase and a second phase. The backing is normally light transmissive, but a peeling force can cause the backing to internally delaminate and become more opaque. A first skin layer is fixed to the backing which minimizes pre-destruct of the backing. A layer of adhesive is applied to the first skin layer, which can be affixed to a substrate.

The invention is also a method for forming a tamper indicating device. A blown film backing and a skin layer are co-extruded. The backing includes a first phase and a second phase. The backing is normally light transmissive and becomes more opaque upon internal delamination. A pressure sensitive adhesive is applied to the skin layer opposite the backing.

BRIEF DESCRIPTION OF THE DRAWINGS

The present invention will be further explained with reference to the appended Figures, wherein like structure is referred to by like numerals throughout the several views.

While the above-identified figures set forth preferred embodiments of the invention, other embodiments are also contemplated, as noted in the discussion. In all cases, this disclosure presents the invention by way of representation and not limitation. It should be understood that numerous other modifications and embodiments can be devised by those skilled in the art which fall within the scope and spirit of the principle of the invention.

DETAILED DESCRIPTION OF THE INVENTION

Figure 1:
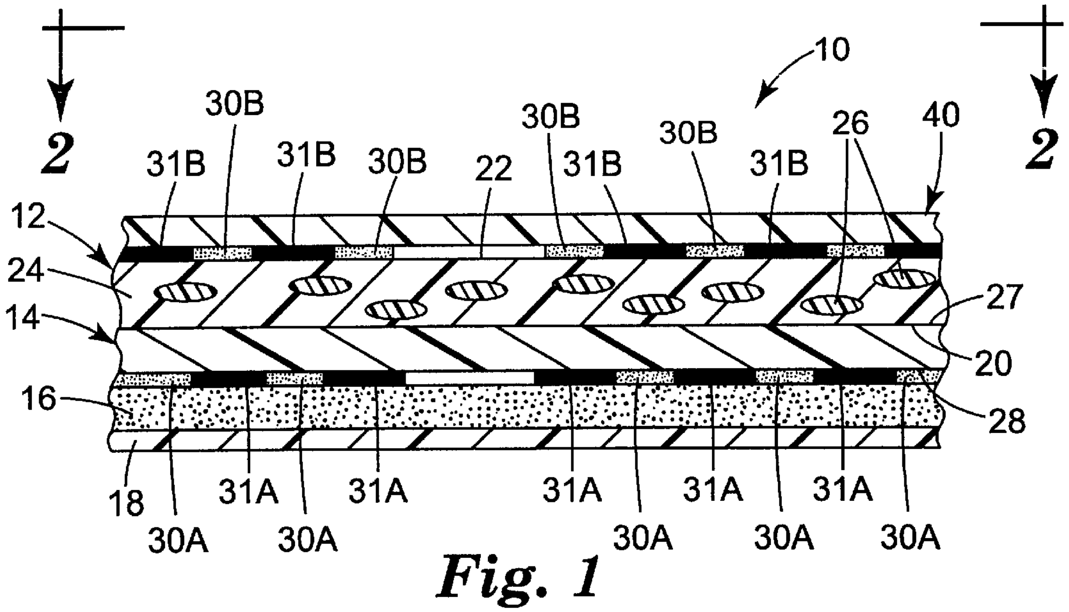
FIG. 1 is a cross-sectional view of a preferred embodiment of a tamper indicating device of the present invention.

A preferred embodiment of a tamper indicating device according to the present invention is shown in FIG. 1 at 10. The tamper indicating device 10 is typically in a tape, label, or labelstock form. The tamper indicating device 10 includes a light transmissive backing 12, a skin layer 14, adhesive 16 and a removable liner 18. The backing 12 includes a first backing surface 20 and a second backing surface 22.

Figure 1A:
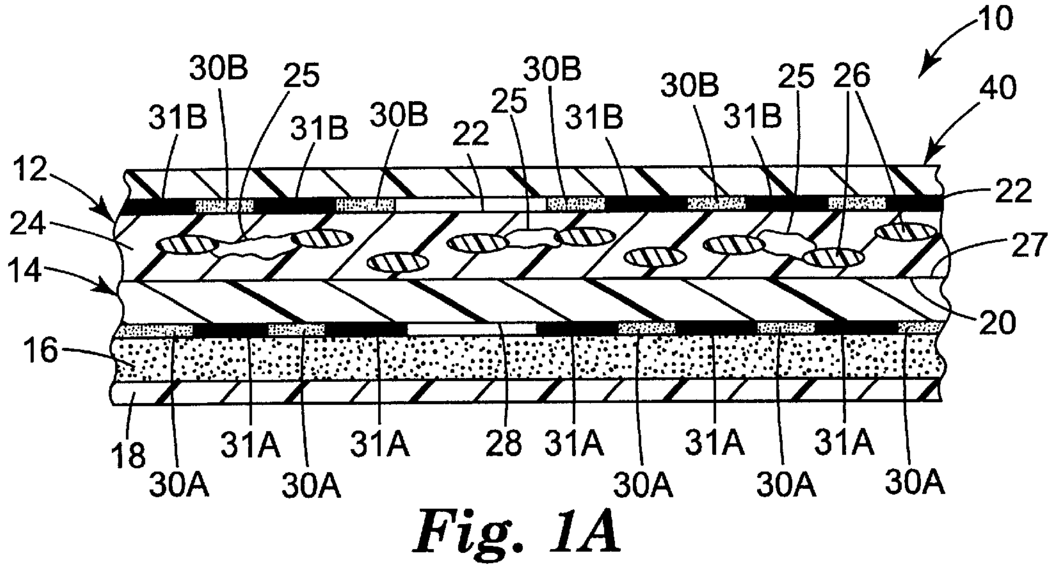
FIG. 1A is a cross-sectional view of an embodiment of a the inventive tamper indicating device after fracturing.

The backing 12 comprises two materials sufficiently incompatible so as to form two phases within the backing 12, a first phase 24 and a second phase 26. A predetermined level of cohesion is formed between the first and second phases 24 and 26 such that when a predetermined level of peeling force is applied so as to pull the first backing surface 20 and second backing surface 22 away from each other the backing 12 will internally delaminate. Preferably, a first phase 24 is continuous and is formed by the first material. A second phase 26, formed from the second material, is discontinuous and forms a multiplicity of inclusions (typically spherical or ellipsoidal bodies enclosed is the first phase 24 material) in the backing. When the backing completely delaminates, the continuous first phase 24 splits along the inclusions of the second phase 26 (discussed further with respect to FIG. 3). "Fracturing" of the backing 12 occurs when the first backing surface 20 is separated from the second backing surface but the backing 12 does not completely separate (first backing surface 20 from second backing surface 22) and instead only separates at isolated fracture points, illustrated at 25 in FIG. 1A internally along the backing 12.

In the preferred embodiment (shown in FIG. 1), the backing 12 comprises a co-extrusion blown film, derived from a composition comprising about seventy-five percent of the material of the first phase 24 and about twenty-five percent of the material of the second phase 26. The co-extrusion blown film process is described below. The first phase material 24 is preferably a random copolymer of polypropylene and polyethylene with the polyethylene comprising approximately four percent of the copolymer, such as FINA 8473 available from FINA Oil and Chemical Company, Dallas, Tex. The second phase material 26 preferably is an ethylene/vinyl alcohol copolymer having 44% molarity of ethylene and 56% molarity of vinyl alcohol, such as EVAL E105A available from EVAL Company of America, Lisle, Ill. Although the above composition of the backing 12 is exemplary, it should be noted that any formulations resulting in a TED backing may be acceptable.

Pre-destruct (or pre-destruction) occurs when pre-destruct forces are applied to the backing 12. Typically, pre-destruct forces occur as the backing 12 is unwound from a roll of tape or as the liner 18 is removed from the adhesive 16 (when preparing to apply the device 10 to a substrate). Pre-destruct typically means that fracture points 25 (see FIG. 1A) develop in the backing 12, although severe pre-destruct forces could result in complete delamination of the device 10 (discussed further with respect to FIG. 3). Fracturing or delamination due to pre-destruct forces can occur for many reasons. The inclusions formed by the second phase 26 in the first phase 24 may not be completely uniform and cause weaker cohesion levels along certain parts of the device 10. Adhesion between the liner 18 and the adhesive 16 may also vary causing "spikes" of pre-destruct force to occur along the length of the device 10. The physical processes used to unwind the device 10 from the roll, or remove the liner may vary in the amount of force applied to the device 10, once again generating "spikes" of force along the length of the device 10. Additionally, variances in cohesion and adhesion properties of the materials in the device can exist which will generate spikes of force and cause fracturing to occur. A person skilled in the art would realize that pre-destruct forces may develop due to other reasons not specifically discussed.

The skin layer 14 is a layer of material applied to the backing 12 which acts to protect the backing 12 from pre-destruct. In one embodiment, the skin layer 14 is a random copolymer of polypropylene and polyethylene with the polyethylene comprising approximately four percent of the copolymer, such as FINA 8473 available from FINA Oil and Chemical Company. It should be noted that in this embodiment, the skin layer 14 is the same material as is used for the first phase 24 material. In some constructions it can be advantageous to utilize the same material for the first phase 24 and the skin layer 14 to obtain superior bonding between the first phase 24 and the skin layer 14. Alternatively, the skin layer 14 can be any of a broad range of materials such as, for example a medium density polyethylene homopolymer such as Escorene LD-129 available from ExxonMobil Chemical Company, Houston, Tex. The skin layer 14 is preferably adhered to the backing 12 through a co-extrusion blown film process (or "blown film process"), as described below. It should be noted, however, that while the preferred embodiment of the invention utilizes a blown film process, a person skilled in the art would realize that other fixation methods may be used, including extrusion, lamination, alternate co-extrusion processes, or by utilizing adhesives. If an adhesive is used to bond the skin layer 14 to the backing 12, it should be an adhesive which bonds at a higher level than the cohesive strength (i.e. greater than the force required to separate the first and second backing surfaces 20 and 22 from each other) of the backing (or TED layer) and does not adversely affect the operation of the device. It should be noted that other skin layer compositions may be used without departing from the spirit and scope of the invention. For example, a "stiff" adhesive may be used as the skin layer 14. The adhesive preferably has a modulus of firmness (G') of between approximately 62169 Pascals and 291163 Pascals at 77° F. (25° C.) to prevent pre-destruct.

The skin layer 14 includes first skin surface 27 and second skin surface 28. The first skin surface 27 is attached to the first backing surface 20. First indicia 30A and second indicia 30B may be applied to the second skin surface 28 and the second backing surface 22, respectively. Likewise, first flood coat 31A and second flood coat 31B may be applied to the second skin surface 28 and the second backing surface 22. The tamper indicating device 10 may optionally include either one, both, or neither of the first and second indicia 30A and 30B and first and second flood coat 31A and 31B (known collectively as "indicators"). Printing the first indicia 30A on the skin surface 28 has the additional advantage of providing a smooth printing surface. This contrasts with printing both indicia 30A and 30B on the backing 12 which typically has a mottled surface. Printing is easier to achieve on the smooth surface of the skin layer 14. It is also easier to dry water or solvent based inks on the skin layer 14.

The device 10 may optionally include an overlaminate layer 40 that can be attached to the second surface 22 of the backing 12, such as by adhesives, extrusion lamination, or co-extrusion. The overlaminate can be used to protect information printed on the backing 12 and skin layer 14 from alteration or removal. Preferred materials for the overlaminate layer include films of polyester, polypropylene, polycarbonate, and SURLYN resin available from E. I. du Pont de Nemours and Company, Wilmington Del. One preferred film is a .00012 inch (0.025 mm) thick biaxially oriented polypropylene film with an acrylic based adhesive commercially available as 3M 311 from 3M Company, St. Paul, Minn. Depending on the material and the intended use, the overlaminate layer 40 will typically have a thickness of from 0.0005 to 0.005 inches (0.013 to 0.13 mm). Indicators can be applied, either on the second surface 22 of the backing 12 or on the surface of the overlarinate layer 40 facing the backing 12. Additional indicators may be provided on either side of the overlaminate layer 40, if desired.

The adhesive 16 is bonded to the second skin surface 28, over the flood coat 31A. The adhesive 16 is provided to adhere the tamper indicating device 10 to an article (described further with respect to FIG. 3). The adhesive 16 should be selected such that the adhesive bond between the adhesive 16 and the article to which the tamper indicating device 10 is adhered is greater than the cohesive strength (i.e. greater than the force required to separate the first and second backing surfaces 20 and 22 from each other) of the backing 12. In this manner, attempts to remove the device 10 from the article (by overcoming the adhesive bond to the article) will cause the device 10 to delaminate.

Although any suitable adhesive may be used, such as a heat activated or pressure sensitive adhesive, in the preferred embodiment of the invention the adhesive comprises a pressure sensitive adhesive. Pressure sensitive adhesives are normally tacky at room temperature and can be adhered to a surface by application of, at most, light finger pressure. A general description of useful pressure sensitive adhesives may be found in *Encyclopedia of Polymer Science and Engineering*, Vol. 13, Wiley-Interscience Publishers (New York, 1988). Additional description of useful pressure sensitive adhesives may be found in *Encyclopedia of Polymer Science and Technology*, Vol. 1, Interscience Publishers (New York, 1964). Examples of pressure sensitive adhesives include resin tackified synthetic rubber adhesives, and in particular styrene-butadiene rubber, styrene-isoprene-styrene block copolymer and styrene-butadiene-styrene block copolymer; and acrylic adhesives and in particular isooctylacrylate/acrylic acid copolymer; and tackified natural rubber adhesives. A particularly preferred class of pressure sensitive adhesives are the (meth) acrylate based adhesives described in U.S. Pat. No. 5,804,610 (Hamer et al.), which is incorporated by reference in its entirety herein. In the alternate embodiment of the inventive tamper indicating device 10 using "stiff" adhesive as the skin layer 14, the pressure sensitive adhesive 16 layer is still applied onto the skin layer 14 to provide bonding to the article.

The adhesive 16 may be covered by the removable liner 18, which is preferably a premium release type such as a silicone release liner. It should be noted that varying the amount of adhesive 16 applied to the skin layer 14 will typically vary the level of adhesion between the liner 18 and the adhesive 16. Typically, when the device 10 is wound in a roll, a silicone acrylate release coating such as is manufactured by Goldschmidt Chemical Corp., Hopewell, VA is disposed onto the top layer of the device (i.e., the overlaminate layer 40 or the second backing surface 22). This release coating is an anti-adhesion coating which prevents the adhesive 16 from sticking to the top layer of the device 10. Preferably, when the anti-adhesive coating is used, the release liner 18 is not included as part of the device.

Backings 12 produced according to the present invention have high light transmissivity levels and low haze, even though the phase separated morphology due to the incompatibility of the first and second materials might be expected to form opaque backings. It is believed that the relative size of the inclusions formed by the second phase 26 and the closeness of the indices of refractions of the components of the backing 12 are such that the backing 12 has good light transmissive properties (i.e. such that flood coat 31A can be viewed through the backing 12). The inclusions formed by the second material typically are approximately 1 micron or smaller, although the invention is not limited to this size. While not wishing to be bound by any theory, it is believed that the inclusions formed by the second, discontinuous phase 26 provide a pattern of weaknesses within the first, continuous phase 24 of the first material. To a certain extent, the cohesive force of the backing 12 can be predetermined to a desired level depending on the materials and ratios of materials selected.

Preferably, the backing 12 is formed by the blown film extrusion process. Forming the backing 12 in this manner allows it to be made thinner than was previously available for tamper evident delaminating films. Preferably, the backing 12 is less than approximately 0.003 inches (0.076 mm) thick. Such thin backings 12 provide the advantage of preventing objects (fingernails, razor blades, etc.) from being inserted between the first backing surface 20 and the substrate to which the device 10 is being adhered. If objects are allowed to be inserted below the backing 12 it is much more likely that the indicating device 10 can be defeated, since when the device can be "pried" off, opposing forces are not generated between the first and second backing surface 20 and 22, thereby preventing delamination from occurring. Thus, thin backings 12 are more effective tamper indicating devices 10. Additionally, thinner backings 12 require less material to manufacture and are more economical to produce. An example of these types of backings is disclosed in PCT Application No. WO 00/43977, which is incorporated by reference herein.

As discussed, removing the liner 18 from the adhesive 16 when preparing to adhere the tamper indicating device 10 can generate forces which are higher than the cohesive strength of the backing 12, depending on the speed at which the liner 18 is removed from the adhesive 16 and the adhesion strength of the adhesive 16. When this level of force is reached, fracturing or delamination (i.e. predestruct) of the device 10 can occur. Additionally, as the tamper indicating device 10 is unwound from a roll, adhesion forces may develop between the second backing surface 22 (or the overlaminate layer 40) and the adhesive 16 (whether or not a release coating is used) which are higher than the delamination strength (or cohesive strength) of the backing 12. As described above, varying the composition of the backing 12 and the size of the inclusions of the second phase 26 material in the first phase 24 material is one method to achieve various levels of cohesion. While this method is an effective method to prevent pre-destruct from occurring while unwinding the device 10 from a roll or removing the liner 18 from the adhesive 16, it also raises the level of force required to delaminate the device 10 to provide an indication of tampering, defeating the purpose of the device 10.

In the past, to alleviate fracturing caused by pre-destruct forces while maintaining desirable cohesive levels in the backing 12, roll unwind speeds were decreased, and anti-adhesion agents (such as silicone) were applied to the removable liner 8 and second backing surface 22 interface. These solutions all were an attempt to lower the pre-destruct forces applied to the indicating device 10. These solutions caused problems in their own right, however, including slowing down the production line speed and adding steps to the manufacturing process, all of which have adverse economic consequences.

The problem of increasing the resistance of the tamper indicating device 10 to pre-destruct forces can be solved by adding the skin layer 14 to the backing 12. Adding a skin layer 14 to the backing 12 acts to prevent pre-destruct which would normally occur in backings 12 without skin layers 14 while still allowing the backing 12 to properly indicate when tampering has occurred. Although the benefit of preventing pre-destruct by adding a skin layer have been observed (see examples which follow), the exact reason why this prevention of pre-destruct occurs is unknown.

As discussed previously, TED films produced using the co-extrusion blown film process are overall very thin and facilitate good tamper indication. The details of the blown film process are well known to those in the art and need not be discussed in great detail herein. In general, the preferred backing 12 and skin layer 14 (together forming a "film") are extruded using a multi-layer die (such as a seven-layer die). A separate extruder is used to feed each layer of the die. A person skilled in the art would realize that other configurations, such as a three layer die, may be used. Typically, extruders 1–5 are charged with the material to form the backing 12 and extruders 6–7 are charged with the material to form the skin layer 14. For very thin skin layers, extruders 1–6 are fed with the backing 12 material and one is fed with the skin material. The extrusion conditions can be adjusted to obtain desired thicknesses. Preferably, a pancake style die with a 60 mil (1.52 mm) gap and 14 inch (35.6 cm) diameter is used.

Figure 1B:
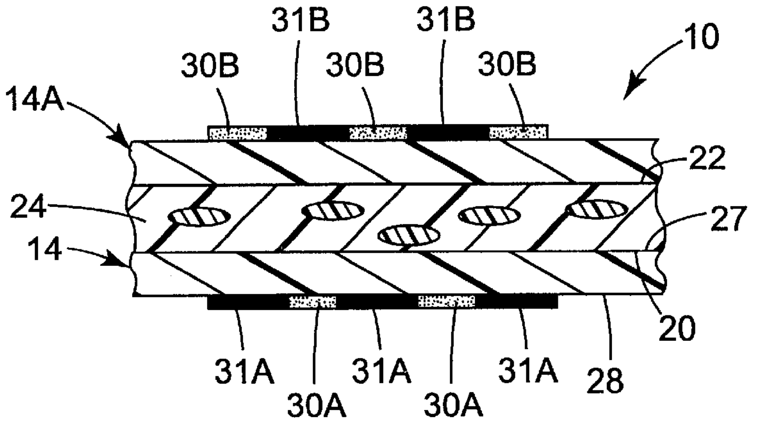
FIG. 1B is a cross-sectional view of an embodiment of the inventive tamper indicating devices.

An additional advantage of the skin layer 14 is that in extrusion processes, it is common for certain components of the indicating device 10 to build up on the lip of the die. For example, the second phase 26 formed from ethylene vinyl alcohol copolymer can commonly build up on the lip of the die. Addition of the skin layer 14 (as opposed to previous TED film which did not include a skin layer 14) prevents intimate contact of the ethylene vinyl alcohol copolymer with the lip of the die. Lip buildup is thereby prevented and a more efficient extrusion process is obtained. It should be noted that a second skin layer 14A may be added to the tamper indicating device by extruding it to the second backing surface 22 of the backing layer 12, as shown in FIG. 1B. Extruding the second skin layer 14A as part of the tamper indicating device 10 further reduces die-lip build up as well as making it easier to print indica 30A and 30B and flood coating 31A and 31B on opposite sides of the backing 12.

The second skin layer 14A may be fixed to the second backing surface 22 using other fixation methods known in the art including extrusion lamination, alternate co-extrusion processes, or by utilizing adhesives (as was described with respect to skin layer 14). Although these fixation methods may not provide the advantage of preventing build up during an extrusion process, they would still allow for easy printing of the indicators on both sides of the backing 12.

Figure 2:
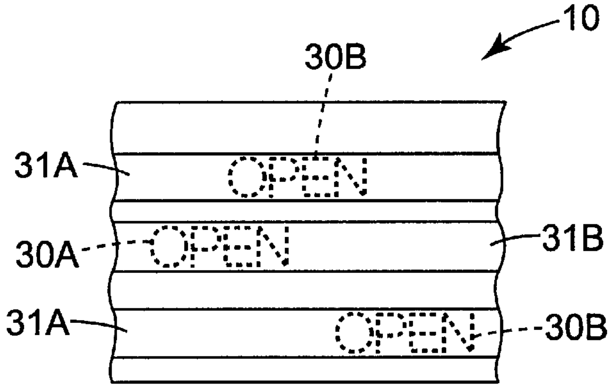
FIG. 2 is a top view of the device of FIG. 1 as taken along line 2—2 of FIG. 1.

In the preferred embodiment shown in FIG. 1, the first indicia 30A and the second indicia 30B indicate the condition of the device 10. Preferably, the first indicia 30A and the second indicia 30B are the same color as the flood coating 31B and 31A. For instance, first indicia 30A may be colored blue along with the second flood coat 31B and the second indicia 30B and first flood coat 31A colored red. In this manner, neither indicia 30A or 30B is initially visually perceptible as shown in FIG. 2. The indicia 30A and 30B, initially are masked from view because the indicia 30A and 30B have insufficient contrast against the flood coating 31A and 31B.

Figure 3:
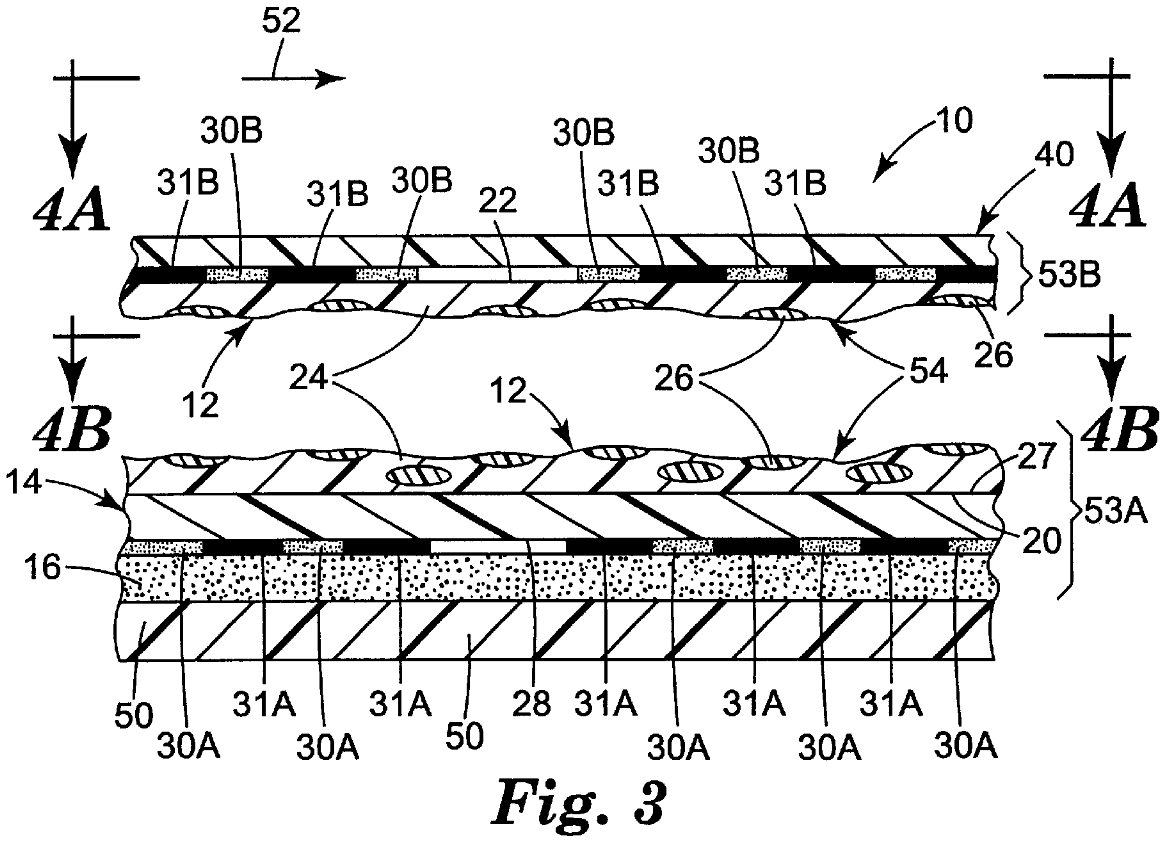
FIG. 3 is a cross-sectional view of the device of FIG. 1 adhered to an article and in a delaminated state.

While attaching the skin layer 14 to the backing 12 prevents fracturing due to the forces generated by liner release or by unwinding the tamper indicating device 10 from a roll (i.e., pre-destruct forces), it does not prevent the device 10 from indicating when tampering has occurred. The force generated by attempting to remove the tamper indicating device 10 from an article (or substrate) 50, referred to as the "peel force", causes the backing 12 to delaminate, as shown in FIG. 3, or fracture (as described previously). In order for the tamper indicating device 10 to delaminate (providing an indication that the device 10 has been tampered with) the adhesive 16 bonds the backing 12 (and skin layer 14) to the article 50 with a bond strength that is greater than the delamination force of the backing 12. By varying the thickness and the type of adhesive 16, the level of adhesion between the substrate 50 and the tamper indicating device 10 can be varied. The adhesive force, however, is always greater than the force required to internally delaminate the backing 12, so that when peeling force is applied to the device 10, the device will delaminate and the second skin surface 28 will remain bonded to the substrate 50.

The backing 12 delaminates substantially in the longitudinal direction of the tamper indicating device 10 as is indicated by arrow 52 in FIG. 3. Upon delamination, the separated portions of the backing (a first portion 53A containing first backing surface 20 and a second portion 53B containing second backing surface 22) become cloudy, and increase in opaqueness. In other words, if the first portion 53A is put back together with the second portion 53B the first indicia 30A and first flood coat 3 1A are obscured and cannot be easily viewed through the second portion 53B of the backing 12. The opaqueness is due to surface irregularities on exposed internal surfaces 54 of the backing 12 created during the delamination of the backing 12. Since the first flood coat 31A (if present) is no longer completely perceptible through the second backing surface 22 of the backing 12, the second indicia 30B is no longer camouflaged.

Figure 4A:
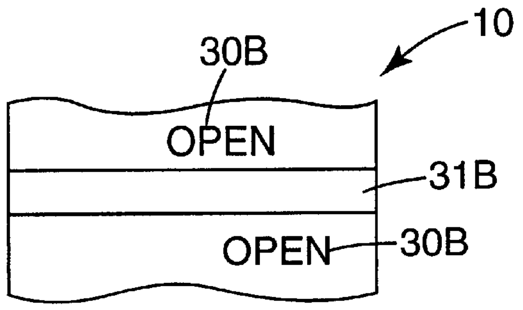
FIG. 4A is a top view of the device of FIG. 3 as taken along line 4A—4A in FIG. 3.
Figure 4B:
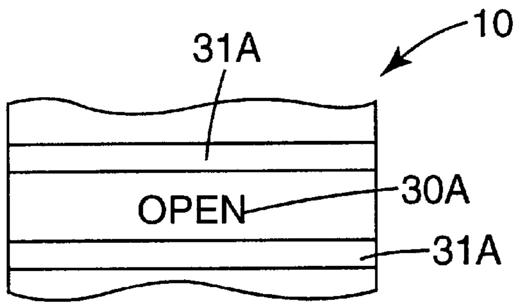
FIG. 4B is a top view of the device of FIG. 3 as taken along line 4B—4B in FIG. 3.

As shown in FIG. 4A, after the internal delamination of the backing 12, the latent second indicia 30B (if present), which was previously camouflaged by the first flood coat 31A, are no longer obscured. The second indicia 30B are now readily-perceptible and indicate that an attempt to remove the tamper indicating device 10 was made. Additionally, if the second portion 53B is completely removed from the first portion 53A, the first indicia 30A can be viewed through the first portion 53A of the device 10 since they are no longer obscured by the second flood coat 31B, as shown in FIG. 4B. Thus, an unambiguous indication of tampering is provided by the device 10. If desired, the first and second indicia 30A and 30B may include alphanumeric characters forming a message indicating that the article 50 is "OPEN" (or any other message) when the device 10 is delaminated. In this manner, the first and second indicia 30A and 30B and the first and second flood coat 31A and 31B cooperatively interact to deliver messages.

Preferably, the separated backing 12 will not re-adhere internally after it has been internally delaminated by the peeling force. The device 10 thereby provides a reliable indication of unauthorized access to the article 50. It should be noted that the peel force used to remove the device 10 from the article 50 may not cause complete delamination and instead may cause partial delamination or fracturing of the device 10. Fracturing is desirable, however, in the context of tamper indication (versus the discussion above referring to pre-destruct forces).

Figure 5:
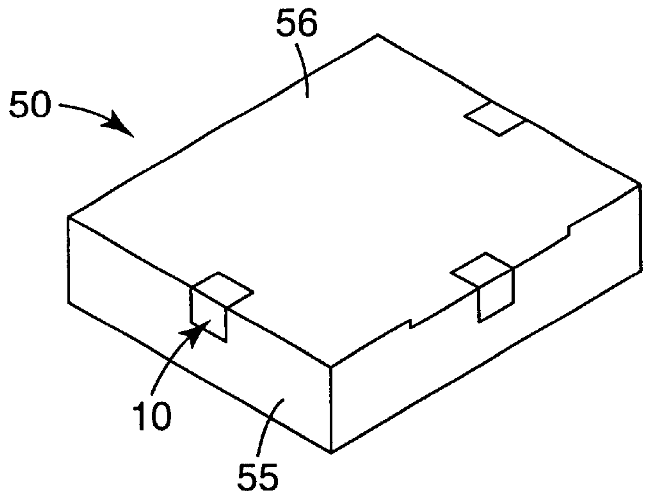
FIG. 5 is an isometric view of an article having a plurality of the devices of FIG. 1 adhered thereto.

FIG. 5 illustrates an embodiment of this invention applied to the article 50. One or more tamper indicating devices 10 (such as tape or labels) are adhered to first and second container parts 55 and 56, such as the lid and side panel of the container. Opening the container requires removal or destruction of the device 10 and thus provides an unambiguous indication of access to the interior of the container. In this embodiment, the article 50 is a box or like container, although a person skilled in the art would realize that any substrate where it would be desirable to indicate tampering may be used. Other examples of article 50 would include envelopes and closed doors.

It should be noted that other configurations of indicators (indicia and/or flood coats) may be used to indicate tampering without departing from the spirit and scope of the invention and are known to those skilled in the art. In one preferred embodiment, the device includes backing 12 and skin layer 14 with first indicia 30A on the second skin surface 28. Adhesive 16 is applied over the first indicia 30A and the second skin surface 28. When the backing 12 delaminates the indica 30A are no longer readable on the second portion 53B of the device 10. No additional indicia are provided, thereby causing the printed message seem to "disappear" upon tampering. In another embodiment, the device comprises backing 12 having a color flood-coated on the second skin surface 28, second indicia 30B (e.g., a message such as "OPEN" or "VOID") on the second backing surface 22, optional overlaminate layer 40 on the second backing surface 22 over the second indicia 30B, and adhesive 16 over the color flood coat on the second skin surface 28, causing a message to "appear" upon tampering. Another embodiment uses a colored adhesive 16 in place of flood coat 31A. By coloring the adhesive 16 to match the color of the second indicia 30B, the second indicia 30B is camouflaged in a similar fashion as was desired previously with respect to the first flood coat 31A. Similarly, the skin layer 14 may be manufactured so as to include pigments (in a manner known in the art) to provide camouflage. Overlaminate layer 40 and/or removable liner 18 may be included in all of the above described embodiments.

The information displayed by indicia 30A and 30B may be varied as well. Such information could include identification such as the serial number of an article 50, to indicate the article 50 is authentic (or any other information that is specifically intended for the particular article 50 to which the device 10 is adhered). Thus, an attempt to remove such an embodiment of the device 10 to place the information on another article will result in internal delamination of the film backing 12 such that the identification number or authenticity verification would be obscured, preventing the device from being re-adhered to that other article. Another preferred embodiment of the present invention is to form the invention into labels that will internally delaminate upon attempts to remove the device 10 from the intended article, thereby preventing the device from being re-adhered to another article.

Although the preferred embodiment of the invention is described with respect to blown film tamper indicating devices which internally delaminate, it should be realized that the inventive skin layer may be used with other methods for forming internally delaminating tamper indicating devices. The skin layer of the present invention may be used with any internally delaminating tamper indicating product, examples of which are disclosed in U.S. Pat. No's. 4,876,123 or 4,980,222, the entire disclosures of both of which are incorporated herein.

The operation of the present invention is illustrated with regard to the following detailed examples. These examples are offered to illustrate the effect the skin layer 14 has on the performance the backing 12. It should be understood, however, that although the examples use specific thicknesses and materials, many variations and modifications may be made to the tamper indicating device 10 while remaining within the scope of the present invention.

Materials

Backing

1. FINA 8473: a random copolymer of propylene/ethylene with an approximate ratio of 96:4 respectively (available from FINA Oil and Chemical Company, Dallas Tex.).
2. EVAL—E105A: an ethylene vinyl alcohol copolymer terpolymer containing 44 mole percent ethylene (available from EVAL Company of America, Lisle, Ill.).

Skin

1. FINA 8473: a random copolymer of propylene/ethylene with an approximate ratio of 96:4 respectively.
2. Escorene LD-129: a low density polyethylene (available from ExxonMobil Chemical Company of Houston, Tex.).

*3. Firm Adhesive #1:85 parts (by weight) 2 ethyl hexyl acrylate, 15 parts acrylic acid, 0.05 parts 4-acryl-oxy-benzophenone (ABP), 0.04 parts isoctylithioglycerate (IOTG) (available from Hampshire Chemical, Waterloo, N.Y.) and 0.15 parts Irgacure 651 (available from Ciba-Geigy Corporation, Ardsley, N.Y.).

*4. Firm Adhesive #2:88 parts 2 Ethyl Hexyl Acrylate, 12 parts Acrylic Acid, 0.05 parts ABP 0.03 parts IOTG, and 0.15 parts Irgacure 651.

*Prepared substantially as described in U.S. Pat. No. 5,804,610

Adhesive

A 2-ethylhexyl acrylate based pressure sensitive adhesive (PSA) similar to that described in U.S. Pat. No. 5,804,610 except that it consisted of 6 parts Acrylic Acid 0.05 parts ABP, 0.1 parts IOTG and 0.15 parts Irgacure 651.

Release Liner 3M internal premium release liner, with release performance comparable to DCP Lojha UPM: 1-3.2RLSN(MS)-7000 (available from DCP-Lojha, Dixon, Ill.).

Fiberboard

C Flute Kraft, 32 pound Edge Crush Test (available from Liberty Carton Company, Minneapolis, Minn.).

Test Method: Tamper Indicating Device Cohesive Strength

A piece of the tamper indicating device having a backing and skin layer was formed using the blown film extrusion process as described above. The thickness of the backing and the skin layer was measured using light microscopy with a graduated eyepiece. Pressure sensitive adhesive (PSA) was hot melt coated onto a release liner and transferred via lamination to the skin layer. Adhesive coat weight was measured by taking the difference between a 24 inches$^2$ (154 cm$^2$) adhesive coated sample and a 24 inches$^2$ (154 cm$^2$) uncoated sample. To hot melt extrude the adhesive, pouch material was fed into a Bonnot Feeder to melt and mix the pouch material. The material was then inserted into a twin screw extruder which fed into a melt pump to meter the adhesive through a hot melt die. All equipment (feeder, extruder, die, hoses) was at 350° F. (177° C.). The adhesive was then cured with ultraviolet light and subsequently laminated to the skin layer. The prepared tamper indicating device was then cut into approximately fifteen to twenty samples, each of which was approximately twelve inches long. The premium release liner was removed from each sample by hand at a moderate to quick rate. This resulted in the liner being peeled at an angle of approximately 180 degrees at the rate of approximately 1500 inches per minute (38.1 meters/min). The samples were then visually inspected for pre-destruct. Each sample was then applied (adhesive side down) onto fiberboard. The samples were affixed in place using two passes of a five hundred gram rubber roller and let dwell for approximately one hour. An attempt was made to manually remove each sample from the fiberboard by picking at the sample with fingers or using razor blades. The samples were then inspected for the level of tamper indication evidence. The average result for each sample was then calculated and recorded.

For examples 6, 6A, 7 and 7A, the firm adhesive used as the skin layer material was coated onto a paper release liner at a specific weight, and transferred to the backing. The pressure sensitive adhesive was then applied to the firm adhesive.

The following rating system for sample visual inspections was used:

Pre-Destruct Rating

None=No evidence of fracturing

Very Slight=One or two samples show small amounts of fracturing

Slight=Several samples show small amounts of fracturing

Moderate=Nearly all samples show slight level of fracturing

Moderate High=Noticeable fracturing on most samples

High=near complete fracturing and partial delamination on most samples

Very High=Complete fracturing, fully delaminated

Tamper Indication Rating

None=Removal from fiberboard with no delamination or fracturing.

Very Slight=Edges show slight amount of fracturing, able to remove most of tape without fracturing.

Slight=Several samples are delaminated, but several also have only a slight amount of fracturing.

Fair=Many samples have delamination. Several samples have slight amount of fracturing.

Good=Complete delamination of most samples, partial delamination of a few samples.

Excellent=Complete delamination.

EXAMPLE 1

A tamper indicating device according to the present invention was provided having the following composition: backing material of FINA 8473 for the first phase and EVAL E105A for the second phase, skin layer material of FINA 8473. The skin layer thickness was approximately 0.00078 inches (0.0198 mm) and the backing and skin layer thickness combined was approximately0.0025 inches (0.064 mm). The adhesive weight was approximately 6 grain/24 inches$^2$ (25.2 grams/meter$^2$)

EXAMPLE 1A

Example 1A was prepared as described in Example 1, except the adhesive weight was approximately 18 grains/24 inches$^2$ (75.5 grams/meter$^2$).

EXAMPLE 1B

Example 1B was prepared as described in Example 1, except the adhesive weight was approximately 24 grains/24 inches$^2$ (100.6 grams/meter$^2$).

EXAMPLE 2

A tamper indicating device according to the present invention was provided having the following composition: backing material of FINA 8473 for the first phase and EVAL E105A for the second phase, skin layer material of FINA 8473. The skin layer thickness was approximately 0.00045 inches (0.011 mm) and the backing and skin layer thickness combined was approximately 0.0025 inches (0.064 mm). The adhesive weight was 6 grains/24 inches$^2$ (25.2 grams/meter$^2$).

EXAMPLE 2A

Example 2A was prepared as described in Example 2, except the adhesive weight was approximately 18 grains/24 inches$^2$ (75.5 grams/meter$^2$).

EXAMPLE 2B

Example 2B was prepared as described in Example 2, except the adhesive weight was approximately 24 grains/24 inches$^2$ (100.6 grams/meter$^2$).

EXAMPLE 3

A tamper indicating device according to the present invention was provided having the following composition: backing material of FINA 8473 for the first phase and EVAL E105A for the second phase, skin layer material of LD-129. The skin layer thickness was approximately 0.00075 inches (0.019 mm) and the backing and skin layer thickness combined was approximately 0.0025 inches (0.064 mm). The adhesive weight was approximately 6 grains/24 inches$^2$ (25.2 grams/ meter$^2$).

EXAMPLE 3A

Example 3A was prepared as described in Example 3, except the adhesive weight was approximately 18 grains/24 inches$^2$ (75.5 grams/meter$^2$).

EXAMPLE 3B

Example 3B was prepared as described in Example 3, except the adhesive weight was approximately 24 grains/24 inches$^2$ (100.6 grams/meter$^2$).

EXAMPLE 4

A tamper indicating device according to the present invention was provided having the following composition: backing material of FINA 8473 for the first phase and EVAL E105A for the second phase, skin layer material of LD-129. The skin layer thickness was approximately 0.00040 inches (0.010 mm) and the backing and skin layer thickness combined was approximately 0.0025 inches (0.064 mm). The adhesive weight was approximately 6 grains/24 inches$^2$ (25.2 grams/meter$^2$).

EXAMPLE 4A

Example 4A was prepared as described in Example 4, except the adhesive weight was approximately 18 grains/24 inches$^2$ (75.5 grams/meter$^2$).

EXAMPLE 4B

Example 4B was prepared as described in Example 4, except the adhesive weight was approximately 24 grains/24 inches$^2$ (100.6 grams/meter$^2$).

EXAMPLE 5

A tamper indicating device according to the present invention was provided having the following composition:

backing material of FINA 8473 for the first phase and EVAL E105A for the second phase, skin layer material of LD-129. The skin layer thickness was approximately 0.0002 inches (0.005 mm) and the backing and skin layer thickness combined was approximately 0.0025 inches (0.064 mm). The adhesive weight was approximately 6 grains/24 inches$^2$ (25.2 grams/meter$^2$).

EXAMPLE 5A

Example 5A was prepared as described in Example 5, except the adhesive weight was approximately 18 grains/24 inches$^2$ (75.5 grams/meter$^2$).

EXAMPLE 5B

Example 5B was prepared as described in Example 5, except the adhesive weight was approximately 24 grains/24 inches$^2$ (100.6 grams/meter$^2$).

EXAMPLE 6

A tamper indicating device according to the present invention was prepared having the following composition: backing material of FINA 8473 for the first phase and EVAL E105A for the second phase, skin layer material of Firm Adhesive #1. The Firm Adhesive used as the skin layer was weighed to approximately 8 grains/24 inches$^2$ (33.6 grams/meter$^2$) and the pressure sensitive adhesive weight was approximately 10 grains/24 inches$^2$ (42.0 grams/meter$^2$).

EXAMPLE 6A

Example 6A was prepared as described in Example 6 except the Firm Adhesive (skin layer) weight was approximately 12 grains/24 inches$^2$ (50.4 grams/meter$^2$).

EXAMPLE 7

A tamper indicating device according to the present invention was prepared having the following composition: backing material of FINA 8473 for the first phase and EVAL E105A for the second phase, skin layer material of Firm Adhesive #2. The Firm Adhesive used as the skin layer weight was approximately 7.5 grains/24 inches$^2$ (31.5 grams/meter$^2$) and the pressure sensitive adhesive layer weight was approximately 10 grains/24 inches$^2$ (42.0 grams/meter$^2$).

EXAMPLE 7A

Example 7A was prepared as described in Example 7 except the Firm Adhesive (skin layer) weight was approximately 12 grains/24 inches$^2$ (50.4 grams/meter$^2$).

COMPARATIVE EXAMPLE 1

A tamper indicating device was prepared which did not include a skin layer. A blown film backing was provided having the following composition: FINA 8473 for the first phase and EVAL E105A for the second phase. The backing thickness was approximately 0.0025 inches (0.064 mm). The adhesive weight was approximately 6 grains/24 inches$^2$ (25.2 grams/meter$^2$).

COMPARATIVE EXAMPLE 1A

COMPARATIVE EXAMPLE 1A was prepared as described in Comparative Example 1, except the adhesive weight was approximately 18 grains/24 inches$^2$ (75.5 grams/meter$^2$).

COMPARATIVE EXAMPLE 1B

COMPARATIVE EXAMPLE 1B was prepared as described in Comparative Example 1A.

COMPARATIVE EXAMPLE 1C

Comparative Example 1C was prepared as described in Comparative Example 1, except the adhesive weight was approximately 22 grains/24 inches$^2$ (92.4 grams/meter$^2$).

COMPARATIVE EXAMPLE 1D

Comparative Example 1B was prepared as described in Comparative Example 1, except the adhesive weight was approximately 24 grains/24 inches$^2$ (100.6 grams/meter$^2$).

The examples and comparative examples described above were tested for Level of Pre-destruct and Tamper Indication by the method described above, with the results reported in the following table:

| Ex. | Skin Material | Skin Thickness mils (microns) | Adhesive Coat Weight grains/24 inches$^2$ (grams/meter$^2$) | Level of Pre-Destruct | Tamper Indication |
|---|---|---|---|---|---|
| 1 | FINA 8473 | 0.78 (19.8) | 6 (25.2) | None | None |
| 1A | FINA 8473 | 0.78 (19.8) | 18 (75.5) | None | Good |
| 1B | FINA 8473 | 0.78 (19.8) | 24 (100.6) | None | Slight |
| 2 | FINA 8473 | 0.45 (11.4) | 6 (25.2) | None | Very Slight |
| 2A | FINA 8473 | 0.45 (11.4) | 18 (75.5) | None | Fair |
| 2B | FINA 8473 | 0.45 (11.4) | 24 (100.6) | None | Very Slight |
| 3 | LD-129 | 0.75 (19.1) | 6 (25.2) | Very Slight | None |
| 3A | LD-129 | 0.75 (19.1) | 18 (75.5) | None | Excellent |
| 3B | LD-129 | 0.75 (19.1) | 24 (100.6) | None | Good |
| 4 | LD-129 | 0.40 (10.1) | 6 (25.2) | Slight | Fair |
| 4A | LD-129 | 0.40 (10.1) | 18 (75.5) | None | Good |
| 4B | LD-129 | 0.40 (10.1) | 24 (100.6) | Very Slight | Excellent |
| 5 | LD-129 | 0.20 (5.1) | 6 (25.2) | Moderate | Fair |
| 5A | LD-129 | 0.20 (5.1) | 18 (75.5) | Slight | Excellent |
| 5B | LD-129 | 0.20 (5.1) | 24 (100.6) | Slight | Good |
| 6 | Firm Adhesive #1 | 1.3 (33) | 10 (42.0) | Moderate | Good–Excellent |
| 6A | Firm Adhesive #1 | 2.0 (50.8) | 10 (42.0) | Very Slight | Good–Excellent |
| 7 | Firm Adhesive #2 | 1.25 (32) | 10 (42.0) | High | Excellent |
| 7A | Firm Adhesive #2 | 2.0 (50.8) | 10 (42.0) | Slight | Excellent |
| CE 1 | | 0 | 6 (25.2) | Very High | Excellent |
| CE 1A | | 0 | 18 (75.5) | High | Excellent |
| CE 1B | | 0 | 18 (75.5) | Very High | Excellent |
| CE 1C | | 0 | 22 (92.4) | Slight–Moderate | Excellent |
| CE 1D | | 0 | 24 (100.6) | Moderate | Excellent |

It can be seen from the above testing that by varying the thickness of the skin layer while keeping the thickness of the tamper indication device constant allows the tamper indicating device to better withstand fracturing caused by predestruct forces. It is evident as well that a low adhesive weight combined with the skin layer causes poor tamper indication. This is understandable, since low levels of adhesion to the substrate would approach the cohesive level of the backing, allowing the removal of the device from the substrate than the delamination of the backing. It is also evident that, when the skin layer was used, no pre-destruct and good/excellent tamper indication performance could be obtained. Specifically, LD-129 at 0.75 mil and LD-129 at 0.40 mil using an adhesive weight of 18 and 24 grains/24 inches$^2$ (75.5 and 100.6 grams/meter$^2$) performed very well. While it appears that increasing the thickness of the skin layer may provide better distribution of the fracturing forces along the device (thereby preventing pre-destruct) it also may allow more possibility that peeling forces can be applied between the first backing surface 20 and the substrate 50, allowing the device to be removed without delamination occurring. Additionally, choosing an adhesive which bonds more strongly to the substrate as well as to the skin layer tends to prevent the adhesive from pulling away from the substrate, providing better delamination. Thus, a person skilled in the art would realize that by varying the thickness of the skin layer, the strength of the adhesive and the thickness of the adhesive, the level of pre-destruct can be kept at acceptable levels while still providing acceptable tamper indication.

The tests and test results described above are intended solely to be illustrative, rather than predictive, and variations in the testing procedure can be expected to yield different results.

The present invention has now been described with reference to several embodiments thereof. The foregoing detailed description and examples have been given for clarity of understanding only. No unnecessary limitations are to be understood therefrom. Unless stated otherwise or unless context requires otherwise, all percentages and ratios of component materials is provided in percent by weight or parts by weight, respectively. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those. structures. All references cited in the above specification are incorporated by reference herein.

What is claimed is:

1. A tamper indicating device, comprising:

a backing including a first phase and a second phase, wherein the backing is light transmissive, and wherein a peeling force causes the backing to internally delaminate and become more opaque;

a first skin layer fixed to the backing wherein the skin layer minimizes pre-destruction of the backing, and has a modulus of firmness (G') of between 62169 Pascals and 291163 Pascals at about 77° F. (25° C.);

a layer of adhesive applied to the first skin layer.

2. A tamper indicating device, comprising:

a backing including a first phase and a second phase, wherein the backing is light transmissive, and wherein a peeling force applied to the tamper indicating device causes the backing to internally delaminate and become more opaque;

a first skin layer comprising a random copolymer of propylene and ethylene wherein the first skin layer is fixed to the backing and minimizes pre-destruction of the backing; and a layer of adhesive applied to the first skin layer.

3. The tamper indicating device of claim 2 wherein the first skin layer is less than or equal to about 0.00078 inches (0.0198 mm) in thickness.

4. The tamper indicating device of claim 2 wherein the layer of adhesive has a weight greater than or equal to about 6 grains/24 inches$^2$ (25.2 grams/meter$^2$).

5. The tamper indicating device of claim 2 wherein the layer of adhesive has a weight less than or equal to about 24 grams/24 inches$^2$ (100.6 grams/meter$^2$).

6. A tamper indicating device, comprising:

a backing including a first phase and a second phase, wherein the backing is light transmissive, and wherein a peeling force applied to the tamper indicating device causes the backing to internally delaminate and become more opaque;

a first skin layer comprising a low density polyethylene wherein the first skin layer is fixed to the backing and minimizes pre-destruction of the backing; and a layer of adhesive applied to the first skin layer.

7. The tamper indicating device of claim 6 wherein the first skin layer is less than or equal to about 0.00075 inches (0.0191 mm) in thickness.

8. The tamper indicating device of claim 5, wherein the layer of adhesive has a weight greater than or equal to about 6 grains/24 inches$^2$ (25.2 grams/meter$^2$).

9. The tamper indicating device of claim 5, wherein the layer of adhesive has a weight less than or equal to about 24 grams/24 inches$^2$ (100.6 grams/meter$^2$).

10. A tamper indicating device, comprising:

a backing including a first phase and a second phase, wherein the backing is light transmissive, and wherein a peeling force applied to the tamper indicating device causes the backing to internally delaminate and become more opaque;

a first skin layer fixed to the backing having a modulus of firmness (G') of between about 62169 Pascals and about 291163 Pascals at about 77° F. (25° C.), wherein the first skin layer minimizes pre-destruction of the backing; and a layer of adhesive applied to the first skin layer.

11. A tamper indicating device, comprising:

a backing including a first phase and a second phase, wherein the backing is light transmissive, and wherein a peeling force applied to the tamper indicating device causes the backing to internally delaminate and become more opaque;

a first skin layer having a modulus of firmness (G') of between about 62169 Pascals and about 291163 Pascals at about 77° F. (25° C.), wherein the first skin layer is fixed to the backing and minimizes pre-destruction of the backing; and a layer of adhesive applied to the first skin layer.

12. The tamper indicating device of claim 11 wherein the first skin layer comprises the same material as the first phase.

13. The tamper indicating device of claim 11 wherein the backing contains about 75 percent by weight of the first phase and about 25 percent by weight of the second phase.

14. The tamper indicating device of claim 11 wherein the backing and the first skin layer are formed using a co-extrusion blown film method.

15. The tamper indicating device of claim 11 wherein the first phase comprises a random copolymer of propylene and ethylene.

16. The tamper indicating device of claim 11 wherein the first skin layer is less than or equal to about 0.00075 inches (0.0191 mm) in thickness.

17. The tamper indicating device of claim 11 further comprising an initially viewable indicator that becomes obscured upon internal delamination of the backing.

18. The tamper indicating device of claim 11 further comprising a latent indicator that becomes viewable upon internal delamination of the backing.

19. The tamper indicating device of claim 11 wherein the backing includes a first backing surface and a second backing surface, and the first skin layer is fixed to the first backing surface and further comprising a second skin layer fixed to the second backing surface.

20. The tamper indicating device of claim 11 further comprising an overlaminate layer on the backing opposite the adhesive layer.

21. The tamper indicating device of claim 11 wherein the first skin layer is composed of an adhesive.

22. The tamper indicating device of claim 11 and further comprising an article, wherein the adhesive affixes to a surface of the article.

23. The tamper indicating device of claim 11, wherein the first skin layer includes pigment.

* * * * *

UNITED STATES PATENT AND TRADEMARK OFFICE

CERTIFICATE OF CORRECTION

PATENT NO. : 6,416,857 B1
DATED : July 9, 2002
INVENTOR(S) : Wright, Mark A.

It is certified that error appears in the above-identified patent and that said Letters Patent is hereby corrected as shown below:

Title page,
Item [56], References Cited, OTHER PUBLICATIONS, "EO 00/43997" should read -- WO 00/43977 --.

Column 15,
Line 56, insert -- and -- after ";".

Column 16,
Lines 12 and 13, "24 grams/24 $inches^2$" should read -- 24 grains/24 $inches^2$ --.
Line 25, after claim 6, insert new claim 7,
-- The tamper indicating device of claim 6, wherein the first phase comprises a random copolymer of propylene and ethylene. --.
Line 26, "7." should read -- 8. --.
Line 29, "8." should read -- 9. --.
Line 29, "5" should read -- 6 --.
Line 32, "9." should read -- 10. --.
Line 32, "5" should read -- 6 --.
Lines 33 and 34, "24 grams/24 $inches^2$" should read -- 24 grains/24 $inches^2$ --.
Line 36, delete claim 10.

Column 18,
Line 10, "composed" should read -- comprised --.

Signed and Sealed this

Twenty-third Day of November, 2004

JON W. DUDAS
*Director of the United States Patent and Trademark Office*